(No Model.) 2 Sheets—Sheet 1.
C. KUNZE.
LATHE FOR TURNING IRREGULAR FORMS.
No. 518,611. Patented Apr. 24, 1894.
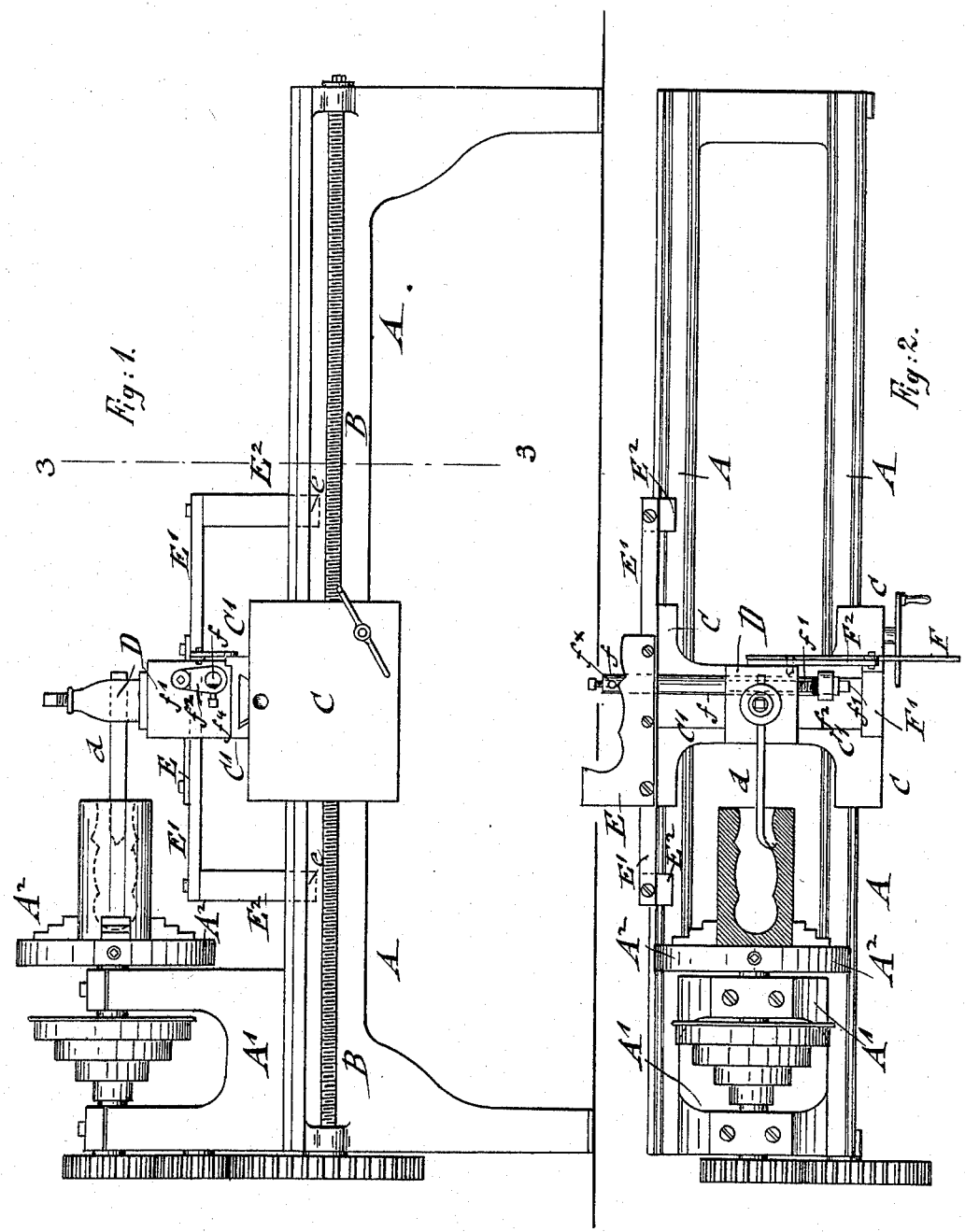
WITNESSES:
Charles Schroeder.
Adolph Scherer.
INVENTOR
Charles Kunze
BY
ATTORNEYS.

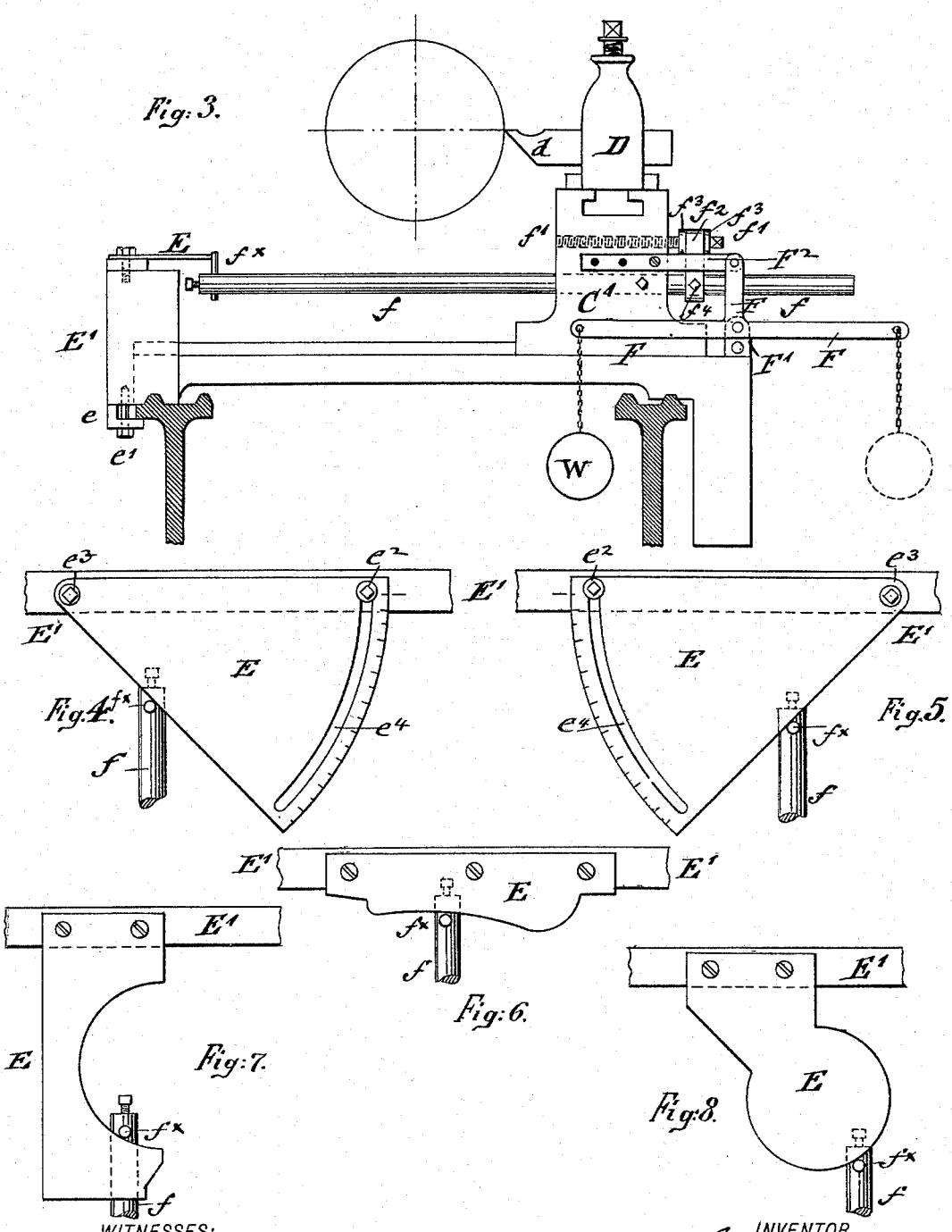

UNITED STATES PATENT OFFICE.

CHARLES KUNZE, OF NEWARK, NEW JERSEY.

LATHE FOR TURNING IRREGULAR FORMS.

SPECIFICATION forming part of Letters Patent No. 518,611, dated April 24, 1894.

Application filed May 2, 1893. Serial No. 472,717. (No model.)

*To all whom it may concern:*

Be it known that I, CHARLES KUNZE, a citizen of the United States, residing in Newark, in the county of Essex and State of New Jersey, have invented certain new and useful Improvements in Lathes for Turning Irregular Forms, of which the following is a specification.

This invention relates to an improved attachment for lathes for turning irregular forms, so that the lathe can be used for working either on the inside of the bodies to be turned or on the outside of the same, it being mainly designed for the purpose of shaping steel-dies, brass and other work.

The invention consists of an attachment for lathes, comprising a templet attached to the rear-shear of the lathe, a tool-post, a cross-feed-slide supported on the slide-rest and provided with a rod which is moved by a guide-pin along the face of the templet, so as to guide the tool to the work, and means for adjusting the guide-rod of the cross feed slide so as to bring the tool to the work.

The invention consists further of certain details of construction and combination of parts which will be fully described hereinafter and finally pointed out in the claims.

In the accompanying drawings, Figure 1, represents a side-elevation of a lathe with my improved attachment for turning irregular forms on the same. Fig. 2, is a plan-view, partly in horizontal section through the piece to be worked on, showing the attachment arranged for doing work at the inside of the piece, to be operated on. Fig. 3, is a vertical transverse section of the lathe on line 3 3, Fig. 1, drawn on a larger scale and showing an end elevation of the attachment, as adapted to outside work, and Figs. 4, 5, 6, 7, and 8 show different forms of templets for doing various kinds of work on the lathe.

Similar letters of reference indicate corresponding parts.

Referring to the drawings A represents the shears of an ordinary lathe and A' the head-stock which supports the spindle of the lathe, to which the chuck for holding the work, is attached. The lathe-spindle receives rotary motion by a belt and cone pulley in the ordinary manner. From the spindle rotary motion is transmitted by suitable gearing to the longitudinal feed-screw B by which longitudinal motion is imparted to the slide-rest C which is guided in ways of the shears, it being moved forward by the rotary motion imparted to the feed-screws B. On the slide-rest C is arranged a cross-feed-slide C' which is guided in transverse ways of the slide-rest and which supports the tool-post D to which the tool $d$ is secured in the usual manner. The cross-feed-slide C' is operated by a cross feed screw, which is provided with a crank-handle at its front-end for moving the cross feed-slide. The cross-feed screw is removed when my attachment for turning irregular forms is to be used.

My attachment consists of a templet E of any suitable form which is attached to a sliding-bar E' that is supported on pillars $E^2$ which are fastened by lugs $e$ and set-screws $e'$ to the rear-shear of the lathe, as shown clearly in Fig. 3. The face or contour of the templet is shaped so as to correspond with the work to be done, and serves for moving in connection with a guide-rod $f$ in the tool-post D the cross-feed-slide and tool-post so as to move the tool into position on the work according to the face of the templet. The guide-rod $f$ passes transversely through the cross-feed-slide C' and is connected with an adjusting screw $f'$ by a strap or link $f^2$, being located on the slide-rest and provided with collars $f^3$ for retaining the strap or link in position, as shown clearly in Fig. 3. By loosening the clamping-screw $f^4$ by which the guide-rod $f$ is connected with the strap or link $f^2$, the guide-rod $f$ can be adjusted back or forth in the cross feed-slide, so that the pin $f^\times$ at its rear-end can be set to move along the templet according as the same is to be used for inside or outside work. In one case, the guide-pin $f^\times$ is guided along the templet which is applied outside of the sliding-bar E while in the other case it is guided along the templet which is applied inside of the sliding-bar. The guide-pin $f^\times$ moves along the face of the templet and moves the cross-feed-slide C' and thereby the tool, so that the same produces the form corresponding to the templet.

For the purpose of keeping the tool in contact with the work, whether the same be used for inside or outside work, an elbow-lever F is used which is fulcrumed to a cross-piece F' that extends across the ways of the cross-feed-slide and is attached thereto by a suitable set-screw. The upper end of the elbow-lever F is connected by a strap $F^2$ with the cross-feed-slide C', said strap being provided with several holes so that the cross-feed-slide can be connected to the strap $F^2$ when the former is nearer to or at greater distance from the cross-piece F' before-mentioned.

The elbow-lever F may be provided either with an ordinary handle when the attachment is to be operated by hand, in which case the attendant has to keep the guide pin $f^\times$ by pressure on the elbow-lever F in contact with the templet, or this may be accomplished automatically by suspending a weight $w$ from either one of the ends of the elbow-lever F, according as the guide-pin $f^\times$ is to be held in contact with the face of the templet for inside or for outside work. For outside work, the weight is attached to the inner end of the elbow-lever F, as shown in full lines in Fig. 3, while for inside work the weight is transferred to the outer end of the elbow-lever F into the position shown in dotted lines in Fig. 3.

When it is desired to impart a conical or taper-shape of any desired inclination to the work, the templets shown in Figs. 4 and 5 are used, which are made in sector-shape and provided with an arc-shaped slot concentric to the outer edge of the templet. A clamping-screw $e^2$ passes through the slot and a second screw $e^3$ through the apex of the templets E, the two clamping-screws serving to secure the templet in any required position. When the proper inclination has been set off on the graduated edge of the sector-shaped templet, the same is fastened in position by the clamping screws $e^2$ $e^3$, so that the guide-pin $f^\times$ moving along the face of the templet produces the corresponding degree of taper on the work operated on. The arc-shaped slot $e^4$ in the sector-shaped templet serves for moving it to the outside of the sliding-bar E' so as to adjust it for inside work, in which case the guide-pin $f^\times$ is arranged so as to move along the rear-edge of the templet.

Other forms of templets for turning round and other work may be used, as shown in Figs. 6, 7 and 8, as any desired form of templet is adapted for use with the lathe.

My improved attachment for lathes is mainly designed for the use of metal workers, as they can thereby turn out the work in the required shape in a much quicker manner than by hand, especially when inside work is to be done, in which case the work is first bored out roughly to the required depth sufficiently for permitting the introduction of the tool which then gives the final shape to the inside of the work.

My work is accomplished by the joint action of the rotary motion imparted to the work, the longitudinal motion imparted to the slide-rest by the feed-screw and the laterally-reciprocating motion imparted to the tool by the action of the templet and guide-bar on the cross-feed-slide.

When the lathe is to be used as an ordinary lathe, the cross feed-screw for moving the cross-feed-slide is replaced in position in the cross feed-slide and either the guide-pin $f^\times$ removed from the guide-rod $f$, or the entire guide-rod $f$ with its guide-pin $f^\times$ removed from the lathe.

The attachment is of simple construction and can be applied to any ordinary lathe in use.

Having thus described my invention, I claim as new and desire to secure by Letters Patent—

1. The combination of a longitudinally reciprocating slide rest, a cross feed slide, a relatively fixed templet, a rod operating against said templet to control the movements of the cross feed slide, means for holding said rod in contact with the templet an adjusting screw carried by the cross feed slide, and independent means for adjustably connecting said adjusting screw with said rod, substantially as described.

2. The combination, with the slide-rest of an ordinary lathe, of a cross-feed-slide guided in ways of said slide-rest, a guide-rod supported in the cross-feed slide and provided with a guide-pin, means for adjusting the rod in the cross-feed-slide, a sliding-bar on the rear-shear of the lathe, a templet attached to said bar, and an elbow-lever fulcrumed to a cross-piece of the slide-rest and strapped to the cross-feed-slide, substantially as set forth.

3. The combination, with the slide-rest of a lathe, of a cross-feed-slide guided in ways of said slide-rest, a tool-post on the cross-feed-slide, a guide-rod supported in the cross-feed-slide and provided with a guide-pin at its rear-end, means for adjusting said guide-rod in the cross-feed-slide, a templet supported on the rear-shear of the lathe, a fulcrumed and weighted elbow-lever, and means for connecting the elbow-lever with the cross-feed-slide, so as to hold the guide-pin of the guide-rod on the face of the templet, substantially as set forth.

4. The combination of a longitudinally reciprocating slide rest, a cross feed slide adapted to move on said slide rest, a templet, a rod co-operating with said templet to produce work of corresponding pattern, an adjusting screw working in the cross feed slide, a link held to the adjusting screw so as to move therewith, and a clamping screw for securing the link to the rod, substantially as described.

5. In a lathe, the combination of a longitudinally reciprocating slide rest, a cross feed slide mounted on the slide rest, a rod connected with said cross feed slide and having a guide pin, a templet, a sliding bar having the templet attached, posts for supporting the sliding bar and having lugs thereon, and screws passing through said lugs and securing the posts to the shear of the lathe, substantially as described.

In testimony that I claim the foregoing as my invention I have signed my name in presence of two subscribing witnesses.

CHARLES KUNZE.

Witnesses:
PAUL GOEPEL,
CHARLES SCHROEDER.